United States Patent
Lin et al.

(10) Patent No.: US 9,264,400 B1
(45) Date of Patent: Feb. 16, 2016

(54) SOFTWARE DEFINED NETWORKING PIPE FOR NETWORK TRAFFIC INSPECTION

(71) Applicant: Trend Micro Incorporated, Tokyo (JP)

(72) Inventors: Chuan-Hung Lin, Taipei (TW); Ching-Yi Li, Taipei (TW); Po-Cheng Liang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 121 days.

(21) Appl. No.: 14/094,442

(22) Filed: Dec. 2, 2013

(51) Int. Cl.
*G06F 21/00* (2013.01)
*H04L 29/06* (2006.01)

(52) U.S. Cl.
CPC ............ *H04L 63/02* (2013.01); *H04L 63/0245* (2013.01)

(58) Field of Classification Search
CPC ............................ H04L 63/02; H04L 63/0245
See application file for complete search history.

(56) References Cited

U.S. PATENT DOCUMENTS

| | | | | |
|---|---|---|---|---|
| 6,697,806 B1* | 2/2004 | Cook | ...................... | G06F 21/31 |
| 6,751,219 B1* | 6/2004 | Lipp | ...................... | H04L 49/201 370/390 |
| 8,339,959 B1* | 12/2012 | Moisand | ............. | H04L 63/0236 370/235 |
| 2003/0021230 A1* | 1/2003 | Kuo | ......................... | H04L 47/10 370/230 |
| 2006/0036780 A1* | 2/2006 | Dernis | ................. | G06F 13/4282 710/36 |
| 2009/0249472 A1* | 10/2009 | Litvin | .................. | H04L 63/0263 726/14 |
| 2009/0300353 A1* | 12/2009 | Hart | ..................... | H04L 63/1416 713/168 |
| 2010/0269171 A1* | 10/2010 | Raz | ......................... | G06F 17/00 726/13 |
| 2010/0278180 A1* | 11/2010 | Ma | ........................ | H04L 49/354 370/392 |
| 2011/0286324 A1* | 11/2011 | Bellagamba | ........ | H04L 41/0677 370/219 |
| 2012/0210416 A1* | 8/2012 | Mihelich | ............. | H04L 63/0218 726/11 |
| 2013/0291088 A1* | 10/2013 | Shieh | .................. | H04L 63/0218 726/11 |
| 2014/0133360 A1* | 5/2014 | Chiueh | .................... | H04L 41/12 370/256 |
| 2014/0211807 A1* | 7/2014 | Takenaka | ................ | H04L 45/74 370/392 |
| 2015/0124629 A1* | 5/2015 | Pani | ..................... | H04L 12/4679 370/248 |
| 2015/0163150 A1* | 6/2015 | Beheshti-Zavareh | . | H04L 45/121 370/400 |
| 2015/0222491 A1* | 8/2015 | Clark | ...................... | H04L 45/48 370/256 |
| 2015/0236900 A1* | 8/2015 | Chung | .................... | H04L 69/02 709/221 |

OTHER PUBLICATIONS

OpenFlow—Wikipedia, the free encyclopedia, 3 sheets [retrieved on Nov. 15, 2013], retrieved from the internet: http://en.wikipedia.org/wiki/OpenFlow.
ONF—Open Networking Foundation, White Paper, Software-Defined Networking: The New Form Norm for Networks, Apr. 13, 2012, pp. 1-12.

\* cited by examiner

*Primary Examiner* — Lisa Lewis
(74) *Attorney, Agent, or Firm* — Okamoto & Benedicto LLP (57) ABSTRACT

A software defined networking (SDN) computer network includes an SDN controller and an SDN switch. The SDN controller inserts flow rules in a flow table of the SDN switch to create an SDN pipe between a sender component and a security component. A broadcast function of the SDN switch to the ports that form the SDN pipe may be disabled. The SDN pipe allows outgoing packets sent by the sender component to be received by the security component. The security component inspects the outgoing packets for compliance with security policies and allows the outgoing packets to be forwarded to their destination when the outgoing packets pass inspection. The SDN controller may also insert a flow rule in the flow table of the SDN switch to bypass inspection of specified packets.

17 Claims, 8 Drawing Sheets

SOFTWARE DEFINED NETWORKING PIPE FOR NETWORK TRAFFIC INSPECTION

BACKGROUND OF THE INVENTION

1. Field of the Invention

The present invention relates generally to computer security, and more particularly but not exclusively to software defined networking.

2. Description of the Background Art

Software defined networking (SDN) is an emerging architecture for computer networking. Unlike traditional computer network architectures, SDN separates the control plane from the data plane. This provides many advantages, including relatively fast experimentation and optimization of switching and routing policies. SDN is applicable to both physical (i.e., real) and virtual computer networks.

The OpenFlow™ protocol is an open protocol for remotely controlling forwarding tables of network switches that are enabled for SDN. Generally speaking, the OpenFlow protocol allows direct access to and manipulation of the forwarding plane of network devices, such as switches and routers. A control plane of an OpenFlow™ protocol-compliant computer network (also referred to as an "OpenFlow™ controller") may communicate with OpenFlow™ switches (i.e., network switches that are compliant with the OpenFlow™ protocol) to set flow policies that specify how the switches should manipulate packets of network traffic. Example packet manipulation actions include forwarding a packet to a specific port, modifying one or more fields of the packet, asking the controller for action to perform on the packet, or dropping the packet.

Figure 1:
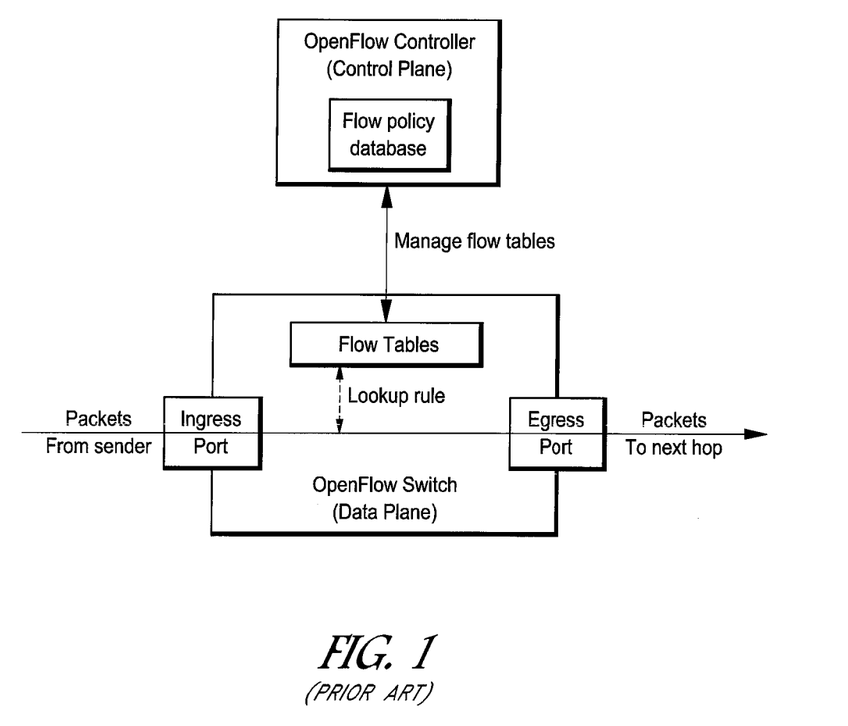
FIG. 1 shows a schematic diagram of an SDN computer network that is compliant with the OpenFlow™ protocol.

FIG. 1 shows a schematic diagram of an SDN computer network that is compliant with the OpenFlow™ protocol. Generally speaking, the OpenFlow™ protocol separates the control plane from the data plane. An OpenFlow™ controller serves as a control plane for making forwarding decisions based on flow policies, which may be stored in a flow policy database. The controller determines flow policies in conjunction with network forwarding setting and network topology. The flow policies may contain a condition and corresponding action to be performed when the condition is met. The action may specify how to manipulate a packet.

An OpenFlow™ switch serves as the data plane that forwards packets, e.g., from an ingress port to an egress port, according to flow tables maintained by the data plane. The data plane is a replacement of traditional switches. When the data plane does not know how to manipulate a specific packet, the data plane may request the controller to receive a flow rule for the specific packet, and store the flow rule in the flow tables. Other packets that meet the same condition as the specific packet will be processed in accordance with the flow rule. The control plane may also actively insert flow rules into the flow tables.

SUMMARY

In one embodiment, a software defined networking (SDN) computer network includes an SDN controller and an SDN switch. The SDN controller inserts flow rules in a flow table of the SDN switch to create an SDN pipe between a sender component and a security component. A broadcast function of the SDN switch to the ports that form the SDN pipe may be disabled. The SDN pipe allows outgoing packets sent by the sender component to be received by the security component. The security component inspects the outgoing packets for compliance with security policies and allows the outgoing packets to be forwarded to their destination when the outgoing packets pass inspection. The SDN controller may also insert a flow rule in the flow table of the SDN switch to bypass inspection of specified packets.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
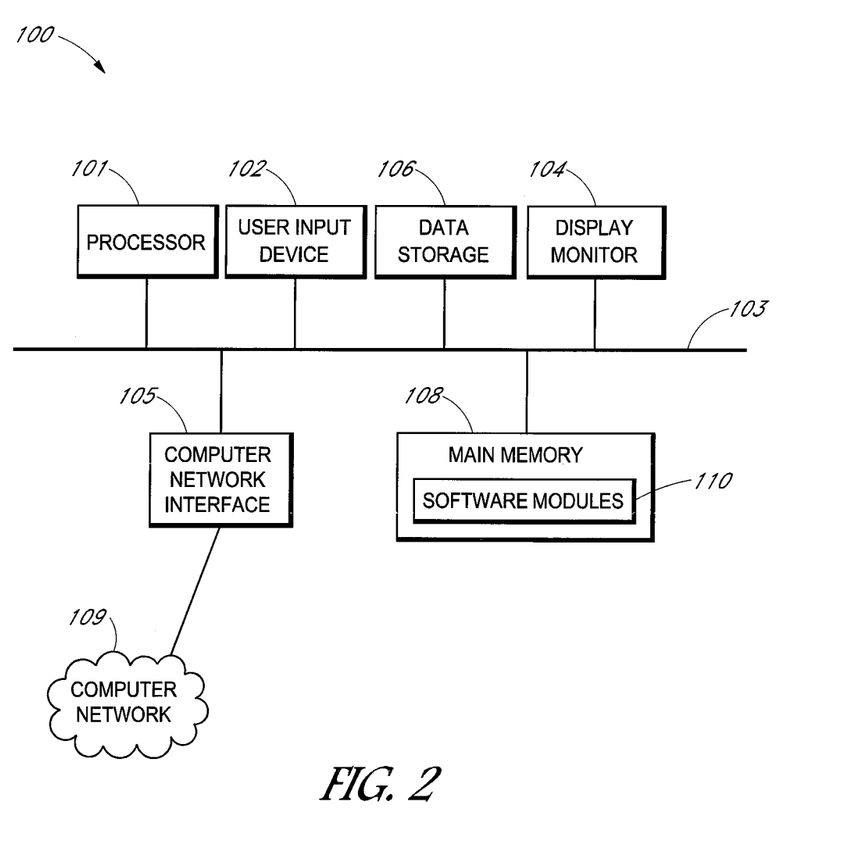
FIG. 2 shows a schematic diagram of a computer system that may be employed with embodiments of the present invention.

FIG. 2 shows a schematic diagram of a computer system 100 that may be employed with embodiments of the present invention. The computer system 100 may be employed as a control plane and/or a data plane, for example. As another example, the computer system 100 may be employed to host a virtualization environment that supports a plurality of virtual machines. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109.

The computer system 100 is a particular machine as programmed with software modules 110. The software modules 110 comprise computer-readable program code stored non-transitory in the main memory 108 for execution by the processor 101. The computer system 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 3:
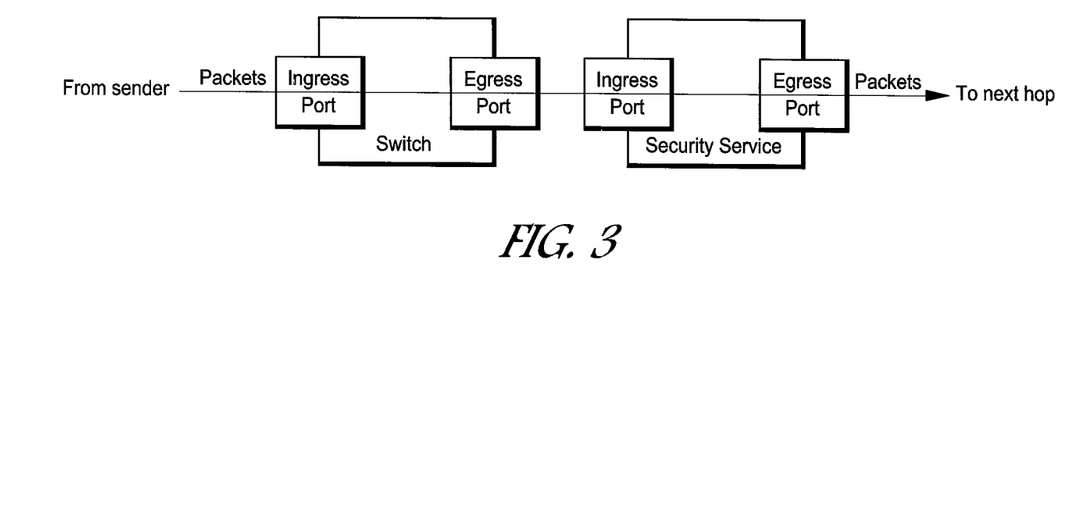
FIGS. 3-5 show schematic diagrams of computer networks that are capable of intercepting network traffic.

Network security vendors provide network security services, such as firewall or deep packet inspection (DPI). Generally speaking, to provide network security services, packets of network traffic are intercepted for inspection. One way of intercepting network traffic is to place the security service in the middle of the packet forwarding path. This is illustrated in FIG. 3, where packets from a sender component (e.g., a sender computer) are received in an ingress port of a switch, forwarded to an egress port of the switch, and forwarded to the ingress port of a security component, such as a security service. The security service may inspect the packets, and forward the packets to an egress port of the switch toward the next hop, which may be another switch or a destination component (e.g., destination computer), for example.

Figure 4:
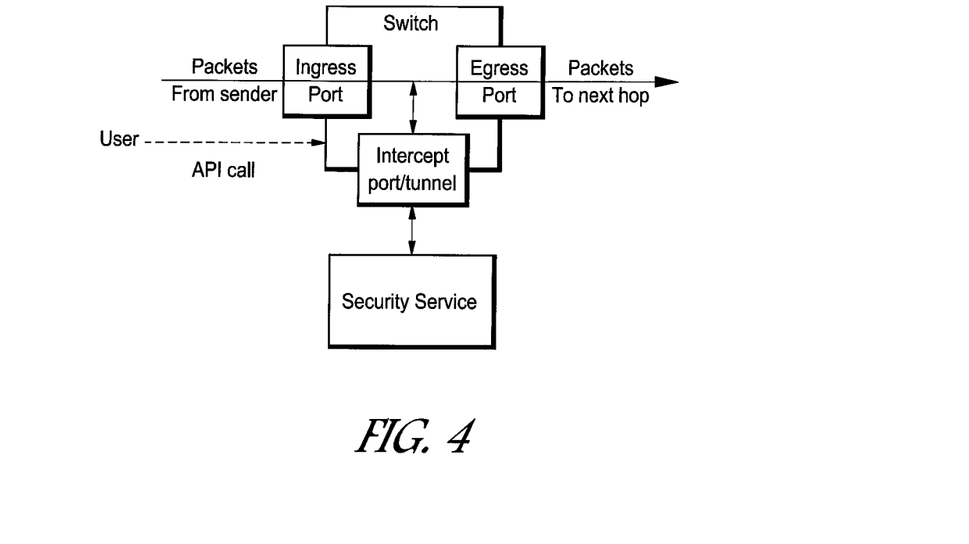

Another way of intercepting network traffic is to mirror the packets to be inspected on a switch that provides vendor specific mirroring application programming interface (API) as shown in FIG. 4. A user may make an API call such that particular packets that enter the ingress port of the switch are redirected or mirrored to the security service by way of a connection tunnel or a mirror port. The security service may forward the redirected or mirrored packets back to an egress port of the switch after inspection.

Figure 5:
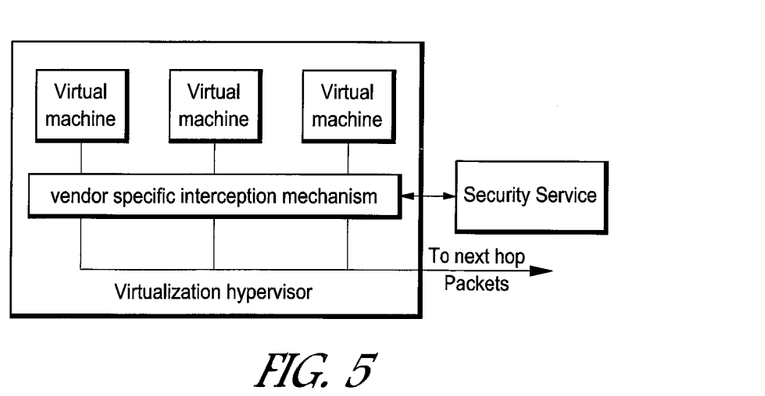

In a virtualized computing environment, network traffic from a virtual machine may be intercepted as the network traffic passes through the hypervisor that runs the virtual machines. This is illustrated in FIG. 5, where packets transmitted by virtual machines are intercepted at the virtualization hypervisor for redirection to a security service.

Figure 6:
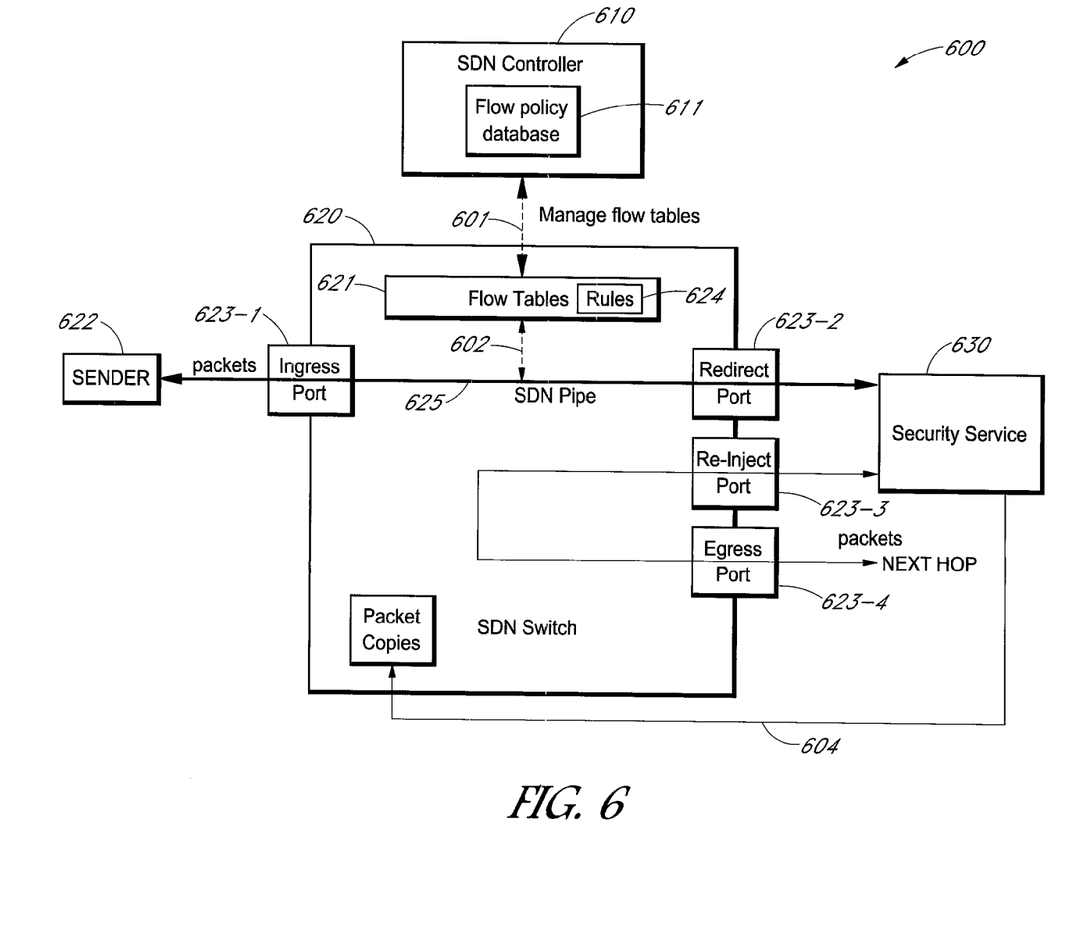
FIG. 6 shows a schematic diagram of an SDN computer network in accordance with an embodiment of the present invention.

Referring now to FIG. 6, there is shown a schematic diagram of an SDN computer network 600 in accordance with an embodiment of the present invention. In one embodiment, the SDN computer network 600 is compliant with the OpenFlow™ protocol. Accordingly, in one embodiment, the SDN controller 610 comprises an OpenFlow™ controller and the SDN switch 620 comprises an OpenFlow™ switch. The SDN controller 610 and the SDN switch 620 comprise the control plane and data plane, respectively, of the SDN computer network 600. The SDN computer network 600 may have a plurality of SDN switches 620 but only one is shown for clarity of illustration. The SDN controller 610 and the SDN switch 620 are logically separate components.

In one embodiment, the SDN computer network 600 is a virtual computer network that allows for transmission of packets from one virtual machine to another. Accordingly, the SDN controller 610 may comprise a virtual OpenFlow™ controller and the SDN switch 620 may comprise a virtual OpenFlow™ switch. The SDN computer network 600 may be implemented in a computer system comprising one or more computers that host a virtualization environment. For example, the SDN computer network 600 may be implemented in the Amazon Web Services™ virtualization environment. The sender component 622 may be a virtual machine in that embodiment.

The SDN computer network 600 may also be implemented using physical or a combination of physical and virtual components. For example, the SDN controller 610 may comprise one or more computers that serve as a control plane for the SDN switch 620. In that embodiment, the SDN switch 620 may comprise an SDN-compliant physical network switch, such as an OpenFlow™ protocol-enabled physical network switch. The sender component 622 may be a computer coupled to a port of the physical network switch.

The SDN controller 610 provides a logically centralized framework for controlling the behavior of the SDN computer network 600. This is in marked contrast to traditional computer networks where the behavior of the computer network is controlled by low-level device configurations of switches and other network devices. The SDN controller 610 may include a flow policy database 611. The flow policy database 611 may comprise flow policies that are enforced by the controller 610 on network traffic transmitted over the SDN computer network 600. The flow policies may specify security policies that govern transmission of packets over the SDN computer network 600. The flow policies may be enforced in terms of flow rules (labeled as 624) that are stored in the flow tables 621 of the SDN switch 620. As a particular example, a flow policy in the flow policy database 611 may indicate inspection of particular packets (e.g., those that meet one or more conditions) by a security service 630. That flow policy may be implemented as a flow rule that forwards the particular packets received in an ingress port 623-1 to the redirect port 623-2 for inspection, for example.

The SDN switch 620 may comprise a plurality of ports 623 (i.e., 623-1, 623-2, 623-3, 623-4, etc.). The SDN switch 620 may forward packets from one port 623 to another port 623 in accordance with flow rules in the flow tables 621. In the example of FIG. 6, the port 6231-1 is coupled to a sender component 622. The port 623-1 is referred to as an "ingress port" in that it is a port for receiving outgoing packets sent by the sender component 622. Similarly, the port 623-4 is referred to as an "egress port" in that it is a port for transmitting outgoing packets sent by the sender component 622. It is to be noted that any port 623 may be employed as an "ingress port," "egress port," "redirect port," or "re-inject port." The aforementioned labels are used herein merely to illustrate processing of packets relative to the sender component 622. Packets going in the opposite direction, i.e., incoming packets that are going to the sender component 622, may be received in the egress port 623-4, forwarded to the re-inject port 623-3, received in the redirect port 623-2, and forwarded to the ingress port 623-1 toward the sender component 622.

The SDN switch 620 may comprise one or more flow tables 621. The flow tables 621 may comprise one or more flow rules (labeled as 624) that indicate how to manipulate or process packets that are passing through the SDN switch 620. As a particular example, a flow rule may indicate that a packet received in the ingress port 623-1 is to be forwarded to the redirect port 623-2. Another flow rule may indicate that a packet received in the redirect port 623-2 is to be forwarded to the ingress port 623-1. The just mentioned pair of flow rules are redirect flow rules that create an SDN pipe between the sender component 622 and the security service 630, allowing the security service 630 to inspect packets sent by or going to the sender component 622. Table 1 shows an example flow table with flow rules that create an SDN pipe between the security service 630 and the sender component 622.

TABLE 1

| IN_PORT | MAC src | MAC dst | IP src | IP dst | ... | Action | Count |
|---|---|---|---|---|---|---|---|
| Ingress_port_ID | * | * | * | * | * | Redirect port | 10 |
| Redirect_port_ID | * | * | * | * | * | Ingress port | 10 |

A flow table may include columns that indicate one or more conditions, a column that indicates an action to take when the conditions are met, and a column for statistics. A row on the flow table may comprise a flow rule. In the example of Table 1, the "Action" column indicates an action to take when conditions are met, and the "Count" column indicates statistics, such as byte count. The rest of the columns of Table 1 indicate conditions. For example, "IN_PORT", "MAC src" (media access control (MAC) address of the source of the packet), "MAC dst" (MAC address of the destination of the packet), "IP src" (Internet Protocol (IP) address of the source of the packet), "IP dst" (IP address of the destination of the packet), etc. are conditions that identify a particular packet. When the conditions are met, i.e., the particular packet is identified, the action indicated in the corresponding "Action" column is performed on the packet. The asterisks in Table 1 indicate an irrelevant condition.

In the example of Table 1, the first and second rows are redirect flow rules for forming an SDN pipe between the sender component 622 and the security service 630. More specifically, the first row of Table 1 is a flow rule instructing the SDN switch 620 to forward packets received in a port having the Ingress_port_ID (e.g., ingress port 623-1) to the redirect port (e.g., redirect port 623-2). Similarly, the second row of Table 1 is a flow rule instructing the SDN switch 620 to forward packets received in a port having a "Redirect_port_ID" to the ingress port.

The SDN computer network 600 may include a security component in the form of the security service 630. The security service 630 may comprise a virtual machine that provides computer network security services, such as packet inspection, for the sender component 622 and other virtual machines. For example, the security service 630 may comprise a virtual machine with a virtual network interface card that is coupled to the redirect port 623-2 and re-inject port 623-3 of the SDN switch 620. The security service 630 may inspect packets for compliance/non-compliance with security policies, such as for presence of malicious code, compliance with firewall rules and access control lists, network intrusion detection, and other computer network security services. The security service 630 may employ conventional packet inspection algorithms. The security service 630 may comprise the Trend Micro Deep Security™ service, for example. The security service 630 may also comprise a physical machine, e.g., a server computer, an appliance, a gateway computer, etc.

The security service 630 may be connected to the SDN switch 620 by a physical link (i.e., using a wire), a virtual link (i.e., in a virtualized environment), or by a software tunnel. As a particular example, instead of using a physical link or a virtual link, the security service 630 may be connected to the SDN switch 620 by a software tunnel using generic routing encapsulation (GRE), stateless transport tunneling (STT), or some other software tunneling protocol supported by the SDN switch 620. In that example, the security service 630 serves as a remote (i.e., not in the same physical or virtual network) service that is only logically connected the SDN switch 620 by way of the software tunnel.

The SDN controller 610 may insert flow rules in the flow tables 621 (see arrow 601) to create an SDN pipe (labeled as 625) between the sender component 622 and the security service 630. The SDN pipe allows outgoing packets sent by the sender component 622 or incoming packets going to the sender component 622 to be redirected to the security service 630 for inspection before the packets are sent out of the SDN switch 620. In one embodiment, the SDN pipe is created by creating a first flow rule that forwards packets received in the ingress port 623-1 to the redirect port 623-2, and a second flow rule that forwards packets received in the redirect port 623-2 to the ingress port 623-1.

Once outgoing packets from the sender component 622 are inspected by the security service 630 and re-injected by the security service 630 back into the SDN switch 620 through the re-inject port 623-3 and then forwarded out to the egress port 623-4, the L2 switching logic of the SDN computer network 600 (which is controlled by the SDN controller 610) remembers that packets destined for the sender component 622 and entering the SDN switch 620 by way of the egress port 623-4 are to be forwarded to the re-inject port 623-3. This allows the security service 630 to also receive incoming packets going to the sender component 622 for inspection.

In one embodiment, the creation of the SDN pipe also includes disabling the broadcast function of the SDN switch 620 to the ingress port 623-1 and the redirect port 623-2. That is, packets that are broadcast to all ports of the SDN switch 620 will not be sent to the ports that form the SDN pipe. Instead, packets that are broadcasted by the SDN switch 620 are received by the security service 630 only through the re-inject port 623-3, and forwarded by the security service 630 to the sender component 622 by way of the SDN pipe between the ingress port 623-1 and the redirect port 623-2. The sender component 622 receives broadcast packets only from the security service 630 in that embodiment. In one embodiment, the SDN controller 610 disables the broadcast function to the ports forming the SDN pipe using the Open vSwitch™ database (OVSDB) management protocol, which is an OpenFlow™ configuration protocol.

After the redirect flow rules for creating the SDN pipe are inserted in the flow tables 621, any packet received by the SDN switch 620 in the ingress port 623-1 will be identified as to be forwarded to the redirect port 623-2, and any packet received by the SDN switch 620 in the redirect port 623-2 will be identified as to be forwarded to the ingress port 623-1 (see arrow 602). This allows the security service 630 to receive from the redirect port 623-2 all outgoing packets sent by the sender component 622 to the ingress port 623-1. The security service 630 may inspect the outgoing packets for compliance with security policies. The security service 630 may drop, or perform other security response, to packets that do not pass inspection (e.g., packets that do not meet firewall policies, packets containing prohibited payload, packets with malicious content, etc.). The security service 630 may forward those packets that pass inspection toward their destination by re-injecting the packets back into the SDN switch 620 by way of the re-inject port 623-3. Once back in the SDN switch 620 by way of the re-inject port 623-3, the flow rules that govern packets received in the ingress port 623-1 and the redirect port 623-2 no longer apply. Accordingly, the re-injected packets are forwarded to the egress port 623-4 (or some other port) toward the next hop in accordance with the L2 switching logic of the SDN computer network 600.

Incoming packets to the sender component 622 that enter the SDN switch 620 on the egress port 623-4 are forwarded to the re-inject port 623-3 in accordance with the L2 switching logic of the SDN computer network 600. The security service 630 receives the incoming packets from the re-inject port 623-3, inspects the incoming packets, and transmits those incoming packets that pass inspection to the redirect port 623-2. The incoming packets are forwarded from the redirect port 623-2 to the ingress port 623-1 in accordance with the flow rules that form the SDN pipe. The sender component 622 is connected to the ingress port 623-1, and receives the incoming packets therefrom.

Re-injecting packets that pass inspection consume bandwidth, as the packets will have to be transmitted by the security service 630 to the re-inject port 623-3. For optimization, the SDN switch 620 may be configured to copy packets that are redirected to the security service 630 for inspection. This way, the security service 630 simply has to inform the SDN switch 620 an action to take on packets based on the result of the inspection (see arrow 604). For example, the security service 630 may send an index identifying the packets and an action on how to manipulate the packets. The action may instruct the SDN switch 620 to drop the copied packets, forward the copied packets to their destinations, quarantine the copied packets, etc.

In one embodiment, bypass flow rules are inserted in the flow tables 621 such that particular packets that do not need to be inspected are not redirected to the security service 630. This embodiment is explained with reference to example flow tables of Tables 2 and 3.

TABLE 2

| IN_PORT | ... | IP src | TCP src port | TCP dst port | ... | Action | Count |
|---|---|---|---|---|---|---|---|
| Ingress_port_ID | * | * | * | 80 | * | Egress port | 120 |
| Egress_port_ID | * | * | 80 | * | * | Ingress port | 120 |
| Ingress_port_ID | * | * | * | * | * | Redirect port | 10 |
| Redirect_port_ID | * | * | * | * | * | Ingress port | 10 |

In the example of Table 2, the first two rows are bypass rules for bypassing packets coming from or going to a transport control protocol (TCP) port 80. More specifically, hypertext transfer protocol (HTTP) packets, i.e., port 80 packets, that are received in the ingress port with the Ingress_port_ID (i.e., ingress port 623-1) are forwarded directly to the egress port (i.e., egress port 623-4), instead of being redirected to the redirect port 623-2 for inspection by the security service 630. Similarly, HTTP packets received in the egress port with the Egress_port_ID (i.e., egress port 623-4) are forwarded directly to the ingress port 623-1 without being redirected to the security service 630.

In the example of Table 2, the bottom two rows are redirect flow rules for forming the SDN pipe between the sender component 622 and the security service 630. Because the bypass flow rules are inserted in the flow tables 621 with higher priority than the redirect flow rules, the bypass flow rules are followed by the SDN switch 620 before the redirect flow rules. Accordingly, HTTP packets are not redirected for inspection by the security service 630. Other packets, i.e., non-HTTP packets, are redirected to the security service 630 per the redirect flow rules. Bypass flow rules and redirect flow rules may be set at different priority levels to meet particular packet inspection needs.

The bypass and redirect flow rules also allow for inspection of particular packets, while allowing all other packets to bypass inspection. This is illustrated in the example flow table of Table 3.

TABLE 3

| IN_PORT | ... | IP src | TCP src port | TCP dst port | ... | Action | Count |
|---|---|---|---|---|---|---|---|
| Ingress_port_ID | * | * | * | 80 | * | Redirect port | 10 |
| Redirect_port_ID | * | * | 80 | * | * | Ingress port | 10 |
| Ingress_port_ID | * | * | * | * | * | Egress port | 130 |
| Egress_port_ID | * | * | * | * | * | Ingress port | 130 |

In the example of Table 3, the top two rows are redirect flow rules for redirecting HTTP packets to the security service 630 for inspection, while the bottom two rows are bypass flow rules for all packets. Because the redirect flow rules are at higher priority than the bypass flow rules, HTTP packets are sent through the SDN pipe formed in the SDN switch 620 between the sender component 622 and the security service 630. All other packets bypass the SDN pipe, and are accordingly not inspected by the security service 630.

Figure 7:
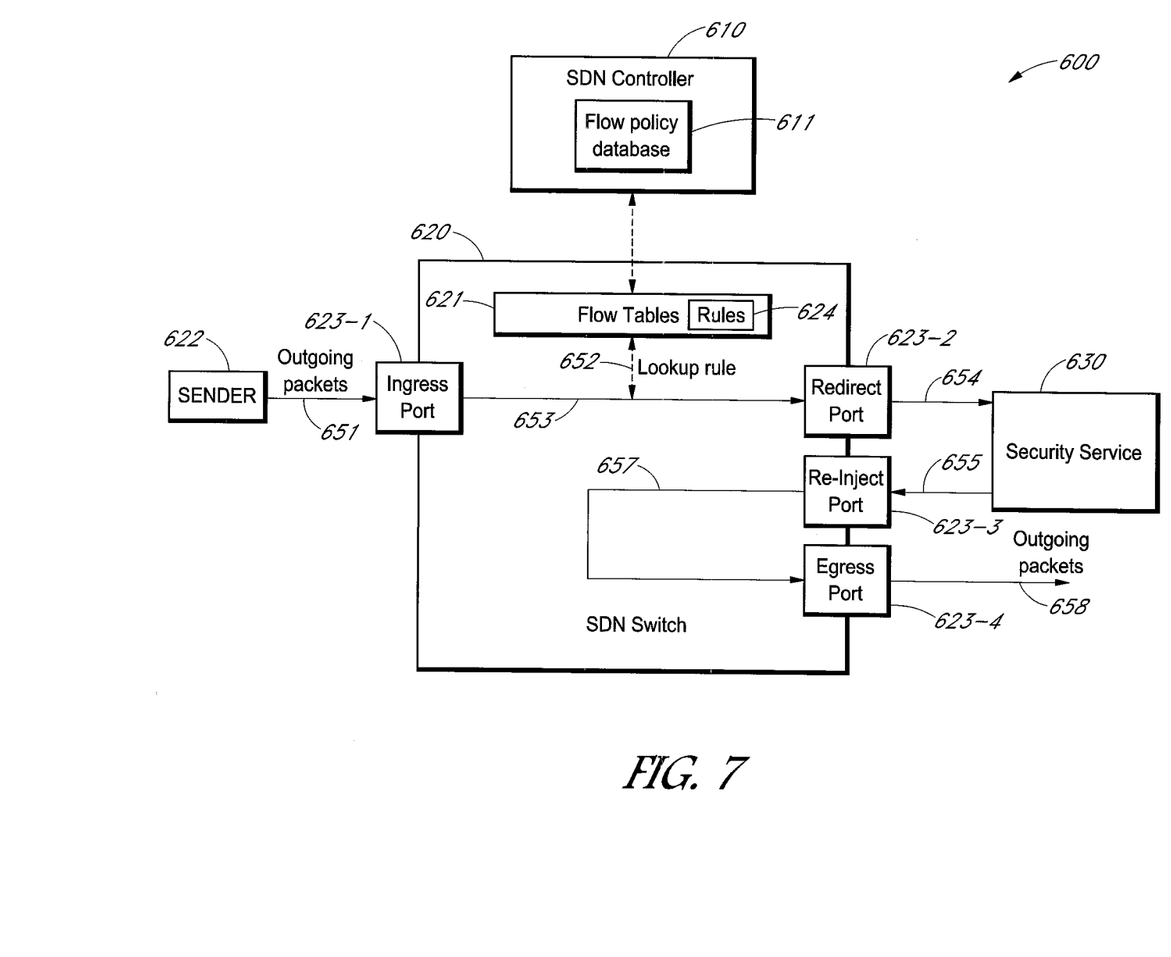
FIG. 7 schematically illustrates inspection of outgoing packets sent by a sender component in the SDN computer network of FIG. 6 in accordance with an embodiment of the present invention.

FIG. 7 schematically illustrates inspection of outgoing packets sent by the sender component 622 in the SDN computer network 600 in accordance with an embodiment of the present invention. In the example of FIG. 7, the sender component 622 (e.g., a virtual machine, a laptop computer, desktop computer, etc.) transmits outgoing packets to the ingress port 623-1 (see arrow 651). The SDN switch 620 receives the outgoing packets in the ingress port 623-1 and follows a flow rule that pertains to the outgoing packets (see arrow 652). In the example of FIG. 7, a redirect flow rule dictates that packets received by the SDN switch 620 in the ingress port 623-1 are to be forwarded to the redirect port 623-2. Accordingly, the SDN switch 620 forwards the outgoing packets to the redirect port 623-2 (see arrow 653), which is connected to the security service 630 (e.g., a virtual machine, server computer, appliance, etc.). The security service 630 receives the outgoing packets from the redirect port 623-2 (see arrow 654) and inspects the outgoing packets. After inspection, the security service 630 re-injects the outgoing packets (e.g., outgoing packets that passed inspection) back into the SDN switch 620 by way of the re-inject port 623-3 (see arrow 655). The SDN switch 620 receives the outgoing packets on the re-inject port 623-3. The SDN switch 620 forwards the outgoing packets from the re-inject port 623-3 to the egress port 623-4 in accordance with the L2 switching logic of the SDN computer network 600 (see arrow 657). The outgoing packets exit the SDN switch 620 through the egress port 623-4 (see arrow 658) and move towards their destination.

Figure 8:
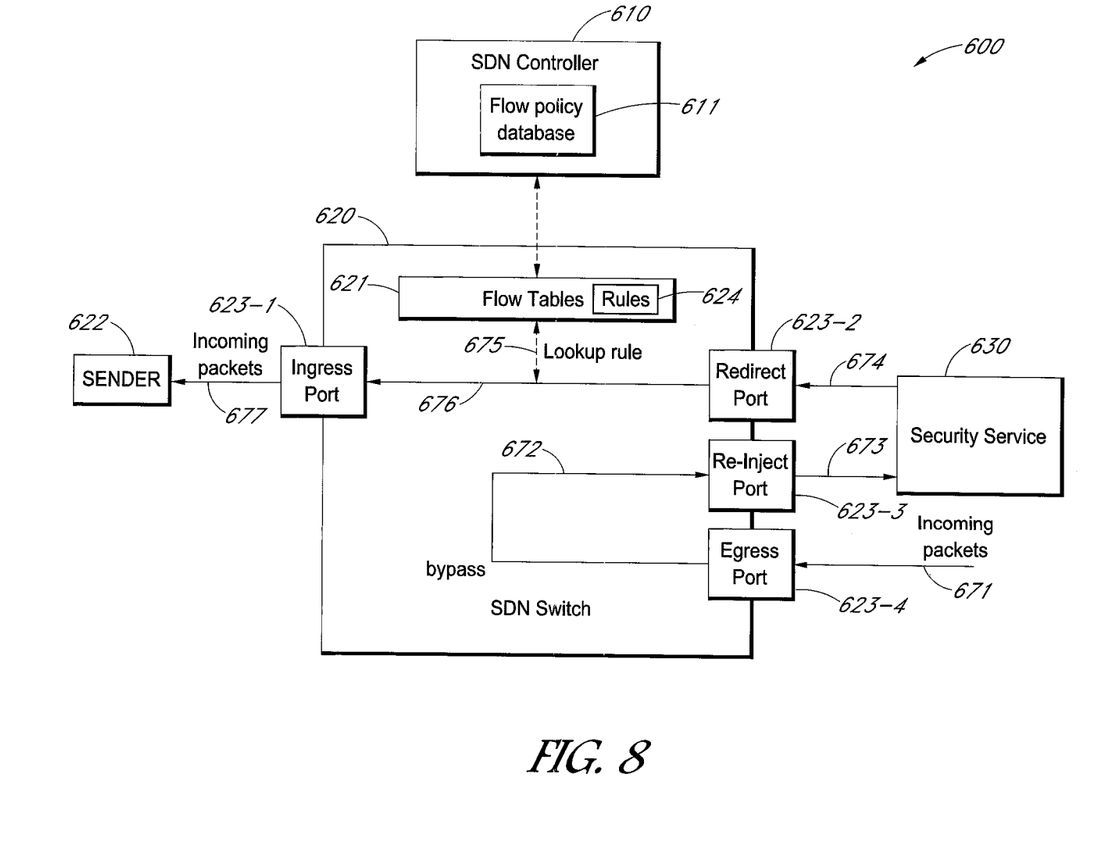
FIG. 8 schematically illustrates inspection of incoming packets to be received by a sender component in the SDN computer network of FIG. 6 in accordance with an embodiment of the present invention.

FIG. 8 schematically illustrates inspection of incoming packets to be received by the sender component 622 in the SDN computer network 600 in accordance with an embodiment of the present invention. In the example of FIG. 8, the incoming packets are received by the SDN switch 620 on the egress port 623-4 (see arrow 671). The SDN switch 620 identifies the incoming packets as to be forwarded to the re-inject port 623-3 in accordance with the L2 switching logic of the SDN computer network 600. Accordingly, the SDN switch 620 forwards the incoming packets from the egress port 623-4 to the re-inject port 623-3 (see arrow 672). The security service 630 receives the incoming packets from the re-inject port 623-3 (see arrow 673), inspects the incoming packets, and transmits the incoming packets (e.g., those that passed inspection) back to SDN switch 620 by way of the redirect port 623-2 (see arrow 674). The SDN switch 620 receives the incoming packets on the redirect port 623-2, and determines from a redirect flow rule in the flow tables 621 that packets received in the redirect port 623-2 are to be forwarded to the ingress port 623-1 (see arrow 675). Accordingly, the SDN switch 620 forwards the incoming packets from the redirect port 623-2 to the ingress port 623-1 (see arrow 676).

The sender component 622 receives the incoming packets from the ingress port 623-1 (see arrow 677).

Figure 9:
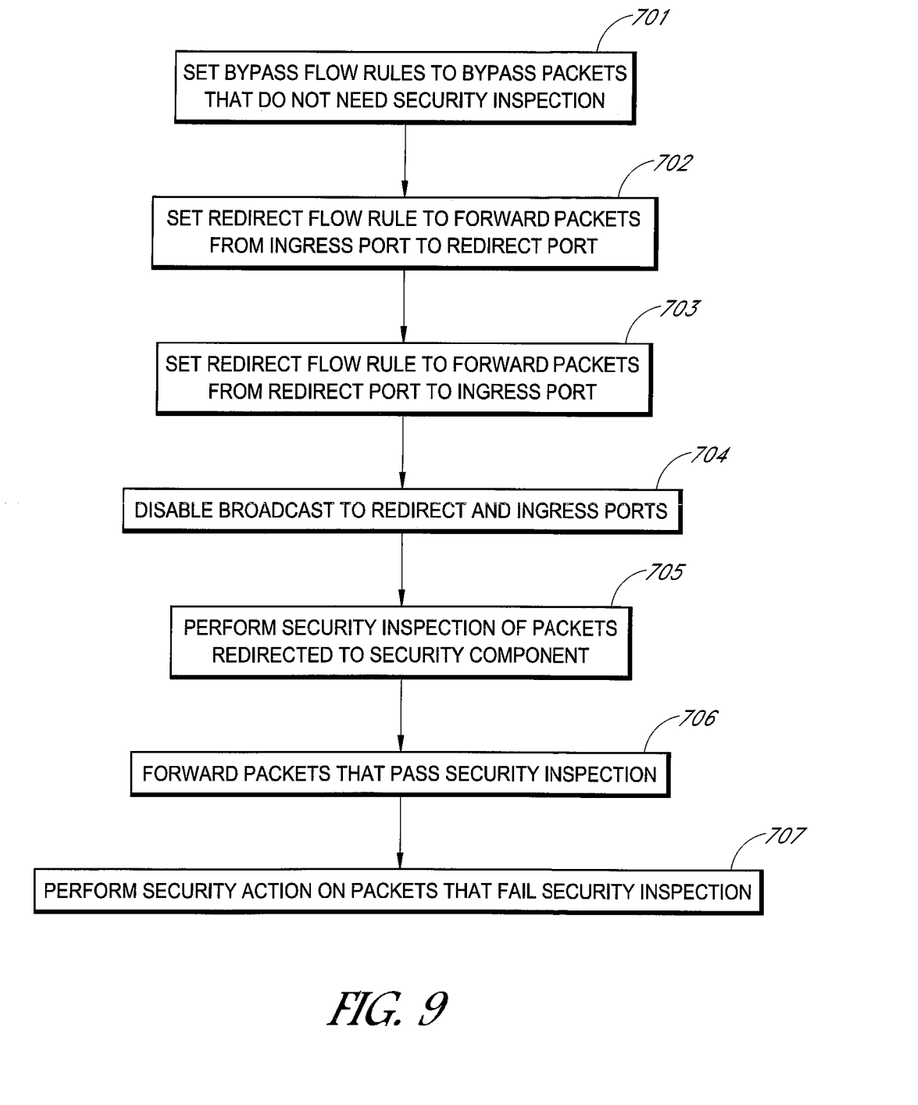
FIG. 9 shows a flow diagram of a computer-implemented method of inspecting network traffic in an SDN computer network in accordance with an embodiment of the present invention.

FIG. 9 shows a flow diagram of a computer-implemented method of inspecting network traffic in an SDN computer network in accordance with an embodiment of the present invention. The method of FIG. 9 may be performed using previously described components for ease of illustration. Other components may also be employed without detracting from the merits of the present invention.

In the method of FIG. 9, the SDN controller inserts one or more bypass flow rules in the flow table of an SDN switch that is controlled by the SDN controller (step 701). The bypass flow rules may instruct the SDN switch to forward particular packets directly from one port to another port of the SDN switch without being redirected to a security component, such as a security service, for inspection. The bypass flow rules may be inserted at higher or lower priority than redirect flow rules for creating an SDN pipe that redirects packets to be inspected to the security service. The security service may comprise a physical or virtual machine that provides a security service by inspecting network traffic.

In the following two steps (steps 702 and 703), an SDN pipe is created in the SDN switch by inserting redirect flow rules in the flow table of the SDN switch. In one embodiment, the SDN pipe formed by the redirect flow rules allows for interception of packets sent by or transmitted to a virtual machine for inspection by the security service. The SDN controller inserts a first flow rule that instructs the SDN switch to forward packets received in an ingress port to a redirect port (step 702). The ingress port may be a port of the SDN switch that is connected to the virtual machine, and the redirect port may be a port of the SDN switch that is connected to the security service. The SDN controller also inserts a second flow rule that instructs the SDN switch to forward packets received in the redirect port to the egress port (step 703). The SDN controller may also disable the broadcast function of the SDN switch to the ingress port and the redirect port (step 704) to prevent the same broadcast packets to be received multiple times by the virtual machine and the security service.

As can be appreciated, the just described redirect rules allow packets received by the SDN switch on the ingress port or packets destined for the virtual machine and received by the SDN switch on the egress port to be received by the security service, and packets received by the SDN switch on the redirect port to be forwarded to the virtual machine. Packets that have been redirected to the security service are inspected by the security service (step 705). The security service forwards packets that pass inspection, e.g., by re-injecting packets that pass inspection back into the SDN switch (step 706). The security service may perform a security response on packets that fail inspection (step 707). For example, the security component may drop packets that fail inspection.

Methods and systems for inspecting network traffic in SDN computer networks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A software defined networking (SDN) computer network comprising:
    an SDN switch comprising a plurality of ports that receives network traffic of an SDN computer network, the SDN switch having a first port coupled to a sender component and a second port coupled to a security component, the SDN switch comprising a flow table that comprises a first flow rule to forward a packet received in the first port to the second port and a second flow rule to forward a packet received in the second port to the first port, the SDN switch receiving outgoing packets from the first port and forwarding the outgoing packets to the second port in accordance with the first flow rule, the outgoing packets being sent by the sender component to a destination component; and
    an SDN controller that controls forwarding behavior of the SDN switch and inserts the first and second flow rules into the flow table of the SDN switch,
    wherein the security component receives the outgoing packets from the second port of the SDN switch, inspects the outgoing packets, and allows the outgoing packets to be forwarded to their destination when the outgoing packets pass inspection,
    wherein the security component allows the outgoing packets to be forwarded to their destination by instructing the SDN switch to release copies of the outgoing packets.

2. The SDN computer network of claim 1, wherein the SDN computer network is in a virtualized computing environment hosted by one or more computers, and the sender component comprises a virtual machine.

3. The SDN computer network of claim 1, wherein the SDN switch comprises a physical packet switch, the SDN controller comprises one or more computers that send flow rules to the SDN switch, and the sender component comprises a computer coupled to the first port of the SDN switch.

4. The SDN computer network of claim 1, wherein the security component allows the outgoing packets to be forwarded to their destination by reinjecting the outgoing packets back to the SDN switch.

5. The SDN computer network of claim 1, wherein the security component performs a security response on the outgoing packets when the outgoing packets do not pass inspection.

6. The SDN computer network of claim 5, wherein the security component drops the outgoing packets when the outgoing packets do not pass inspection.

7. The SDN computer network of claim 5, wherein the flow table of the SDN switch includes a bypass flow rule that forwards specified packets directly from the first port of the SDN switch to a third port of the SDN switch without being forwarded to the security component for inspection.

8. The SDN computer network of claim 7, wherein the specified packets are packets having a particular transport control protocol (TCP) source or destination port.

9. The SDN computer network of claim 1, wherein a broadcast function of the SDN switch to the first port of the SDN switch and the second port of the SDN switch is disabled.

10. A computer-implemented method of inspecting network traffic in a software defined networking (SDN) computer network, the method comprising:
    inserting a first flow rule in a flow table of an SDN switch, the first flow rule instructing the SDN switch to forward packets received in a first port of the SDN switch to a second port of the SDN switch;
    inserting a second flow rule in the flow table of the SDN switch, the second flow rule instructing the SDN switch to forward packets received in the second port of the SDN switch to the first port of the SDN switch;
    disabling a broadcast function of the SDN switch to the first port of the SDN switch and to the second port of the SDN switch;

forwarding outgoing packets from the first port of the SDN switch to the second port of the SDN switch in accordance with the first flow rule;
receiving the outgoing packets in a security component coupled to the second port of the SDN switch;
inspecting the outgoing packets in the security component for compliance with security policies;
storing a copy of the outgoing packets in the SDN switch; and
after inspecting the outgoing packets in the security component, instructing the SDN switch to release the copy of the outgoing packets when the outgoing packets pass inspection for compliance with the security policies.

11. The computer-implemented method of claim 10, further comprising:
after inspecting the outgoing packets in the security component, reinjecting the outgoing packets back into the SDN switch when the outgoing packets pass inspection for compliance with the security policies.

12. The computer-implemented method of claim 10, further comprising:
after inspecting the outgoing packets in the security component, dropping the outgoing packets when the outgoing packets do not pass inspection for compliance with the security policies.

13. The computer-implemented method of claim 10, further comprising:
inserting a third flow rule in the flow table of the SDN switch, the third flow rule instructing the SDN switch to forward specified packets directly from the first port of the SDN switch to a third port of the SDN switch to bypass inspection of the specified packets by the security component.

14. A computer-implemented method of inspecting network traffic in a software defined networking (SDN) computer network, the method comprising:
receiving outgoing packets in a first port of an SDN switch;
forwarding the outgoing packets from the first port of the SDN switch to a second port of the SDN switch in accordance with a first flow rule inserted by an SDN controller in a flow table of the SDN switch, the first port of the SDN switch being coupled to a virtual machine and the second port of the SDN switch being coupled to a security component;
receiving the outgoing packets in the security component by way of the second port of the SDN switch;
inspecting the outgoing packets in the security component; and
releasing a copy of the outgoing packets stored in the SDN switch when the outgoing packets pass inspection by the security component.

15. The computer-implemented method of claim 14, further comprising:
reinjecting the outgoing packets back into the SDN switch when the outgoing packets pass inspection by the security component.

16. The computer-implemented method of claim 14, wherein the outgoing packets are transmitted by the virtual machine to a destination component.

17. The computer-implemented method of claim 14, further comprising:
disabling a broadcast function of the SDN switch to the first port of the SDN switch and to the second port of the SDN switch.

* * * * *